United States Patent
Pulicharla et al.

(10) Patent No.: US 10,862,841 B1
(45) Date of Patent: Dec. 8, 2020

(54) SYSTEMS AND METHODS FOR AUTOMATING VOICE COMMANDS

(71) Applicant: Rovi Guides, Inc., San Jose, CA (US)

(72) Inventors: DurgaPrasad Pulicharla, Andhra Pradesh (IN); Madhusudhan Srinivasan, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 16/678,246

(22) Filed: Nov. 8, 2019

(51) Int. Cl.
| | |
|---|---|
| *H04L 29/06* | (2006.01) |
| *H04L 12/58* | (2006.01) |
| *G10L 15/22* | (2006.01) |
| *G06F 16/909* | (2019.01) |
| *G06F 16/9032* | (2019.01) |
| *G06F 16/908* | (2019.01) |

(52) U.S. Cl.
CPC .......... *H04L 51/20* (2013.01); *G06F 16/908* (2019.01); *G06F 16/909* (2019.01); *G06F 16/90332* (2019.01); *G10L 15/22* (2013.01); *H04L 51/046* (2013.01); *G10L 2015/223* (2013.01)

(58) Field of Classification Search
CPC ....... H04L 51/20; H04L 51/046; G10L 15/22; G10L 2015/223; G06F 16/90332; G06F 16/908; G06F 16/909
See application file for complete search history.

(56) References Cited

U.S. PATENT DOCUMENTS

| | | | |
|---|---|---|---|
| 8,954,318 B2 | 2/2015 | Barve et al. | |
| 9,819,714 B2* | 11/2017 | Song | ........................ H04L 65/60 |
| 2012/0246191 A1* | 9/2012 | Xiong | ................ H04N 21/6581 |
| | | | 707/769 |
| 2015/0378591 A1* | 12/2015 | Yang | ...................... G06F 16/43 |
| | | | 715/863 |

OTHER PUBLICATIONS

U.S. Appl. No. 16/678,242, filed Nov. 8, 2019, DurgaPrasad Pulicharla.
"Outline of natural language processing" (http://en.wikipedia.org/wiki/Outline_of_natural_language_processing); downloaded Feb. 5, 2020, 25 pgs.

* cited by examiner

*Primary Examiner* — Kim T Nguyen
(74) *Attorney, Agent, or Firm* — Haley Guiliano LLP

(57) ABSTRACT

A method of detecting establishment of a voice communication between a first voice communication equipment and a second voice communication equipment and automating requests for content. The method includes analyzing the voice communication to detect a request for content, analyzing the voice communication to identify the request for content as a request to share content between a first user account and a second user account, and identifying the requested content from a data storage. The method includes causing the sharing of the requested content with the second user account.

20 Claims, 8 Drawing Sheets

SYSTEMS AND METHODS FOR AUTOMATING VOICE COMMANDS

BACKGROUND

The present disclosure relates to systems and processes for electronically processing voice conversations and, more particularly, to automating the execution of a task based on processing the conversation.

SUMMARY

Users conversing across devices such as cell phones often make requests during the conversation for certain information or content. For example, a user may ask the other user for a person's contact information or their picture and/or, for example, content relating to particular events, places, and/or time frames. Alternatively, the one user may volunteer the specific data which the other user needs to receive.

While conversing on a mobile device, it can be cumbersome to perform the steps needed to share such content including, for example, sending an email or text message with attachments or posting content on a social media platform. The limited interface of many mobile devices can make finding contacts, selecting attachments, etc., a time consuming process. Thus, a user may be required to interrupt the conversation in order to focus on finding the requested content and facilitating the sharing of the content. A user may prefer to share the content and, for example, discuss the shared information without first needing to interrupt the conversation.

To address these problems with sharing content while users converse over communication devices, systems and methods are described herein that electronically process voice communications exchanged between devices and, based upon the processing, identify particular requests identified in the communications and automate execution of the request without requiring intervention or an interruption of the conversation by users of the devices. having to access a different service in order to share the requested or volunteered data.

In some embodiments, a computer-implemented method includes sharing content from a first voice communication equipment, the method including detecting establishment of a voice communication between the first voice communication equipment and a a second voice communication equipment, analyzing the voice communication and identifying, from the analysis, a request for or offer of content. The voice communication may be further analyzed to identify an affirmative response to receiving the request for or offer for content. The request and affirmative response may be correlated with user accounts. In response to identifying the affirmative response to receiving the request or offer for content, the method identifies content from data storage based upon the request or offer and correlated user accounts. The method then causes transmission of and/or sharing of the identified content with the recipient account/device.

For example, in an embodiment, an analyzed voice communication includes a request for data files, such as picture images of an event at a certain place and/or time identified by analyzing the voice communication in context of the correlated user accounts. At least one of the devices is programmed and configured to electronically process the voice communication and of one or more devices (e.g., a mobile device and/or a remote server). The processing of voice communications may be used to associate the voices with separate user accounts and automatically identify the request for or offer of specific data, such as picture image, as well as identify an affirmation of the request or offer with a user account being asked to share content (e.g., images). A method according to some embodiments identifies the specified images based upon a specified event, place and/or time, after which the data is shared with the recipient user account/device, for example, by text, email, social media post, and/or other specified process.

The content may be transmitted over the same network which supports the voice communication. For example, a mobile communications network supporting a voice call between parties may also be used to supply data, such as text or images, via text messaging on that network. Alternatively, in some embodiments the processing may include the ability to process voice commands or automatically to transmit the requested data via another communications route, such as a local area network to which the devices, or at least the receiving device, is connectable. This may have benefits if the requested content is a large file better suited to being sent over a network with a wider bandwidth. In some embodiments, the request may be executed immediately, i.e. during the voice communication, as part of the conversation. However, the system may be operable to detect that the voice call has been terminated and use the termination as a trigger for executing the request over the same network or an alternative network. The user of the recipient device may then be better able to look at or otherwise process the requested content when not engaged in the voice call.

In some embodiments, an action engine and natural language processor is programmed and configured to process a computer generated text output of the conversation with voices correlated to particular user accounts, identify particular utterances from the conversation that represent and may trigger an action (e.g., a response to a request for or offer of images), and determine which specific computer-executable commands to use to execute the action (e.g., commands for generating text message, email message, etc. . . . ). Once the appropriate commands are determined, they are executed without requiring a user to input the commands themselves such as while further participating in a conversation.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

A voice communication processing method according to some embodiments detects the establishment of a voice communication between two or more devices (e.g., mobile phones) and analyzes the voice communication to identify a request for or offer of content. In the following description reference is made to a request for content, but unless specified otherwise, it applies equally to the offer of content. The request for content can include, for example, a request for contact information, images, files, or other types of content. The request may be identified by particular utterances or phrases detected in the voice communication using, for example, a voice-to-text converter and keyword/phrase database such as further described below. In an embodiment, the method further analyzes the voice communication for a response affirming the request.

In response to determining that a content request has been made and/or affirmed, the method further processes the voice communication to determine the parameters (e.g., names, places, locations, type of content) of requested content. Processing the request may be performed with the use of a Natural Language Processor or other language processing tools. Once the parameters of content are determined, a search is performed of stored content (e.g., in device memory, social media stores, cloud storage) that correlate to the parameters. The type, location, and other parameters of the content may also be based upon associating the request and affirmation with particular user accounts or devices through which the voice communications are processed. For example, the location and type of content searched may be associated with a particular user account and/or the device communicating the affirmation to a requesting device/account. Content that is identified from the search may be automatically transmitted to or shared with the requesting device/account such as through texting, email, social media, etc. A user account can include a mobile device account tied to a phone number, email account, instant messaging, social media account, content subscription account (e.g., Amazon), and/or other user accounts tied to unique user identification(s).

Figure 1:
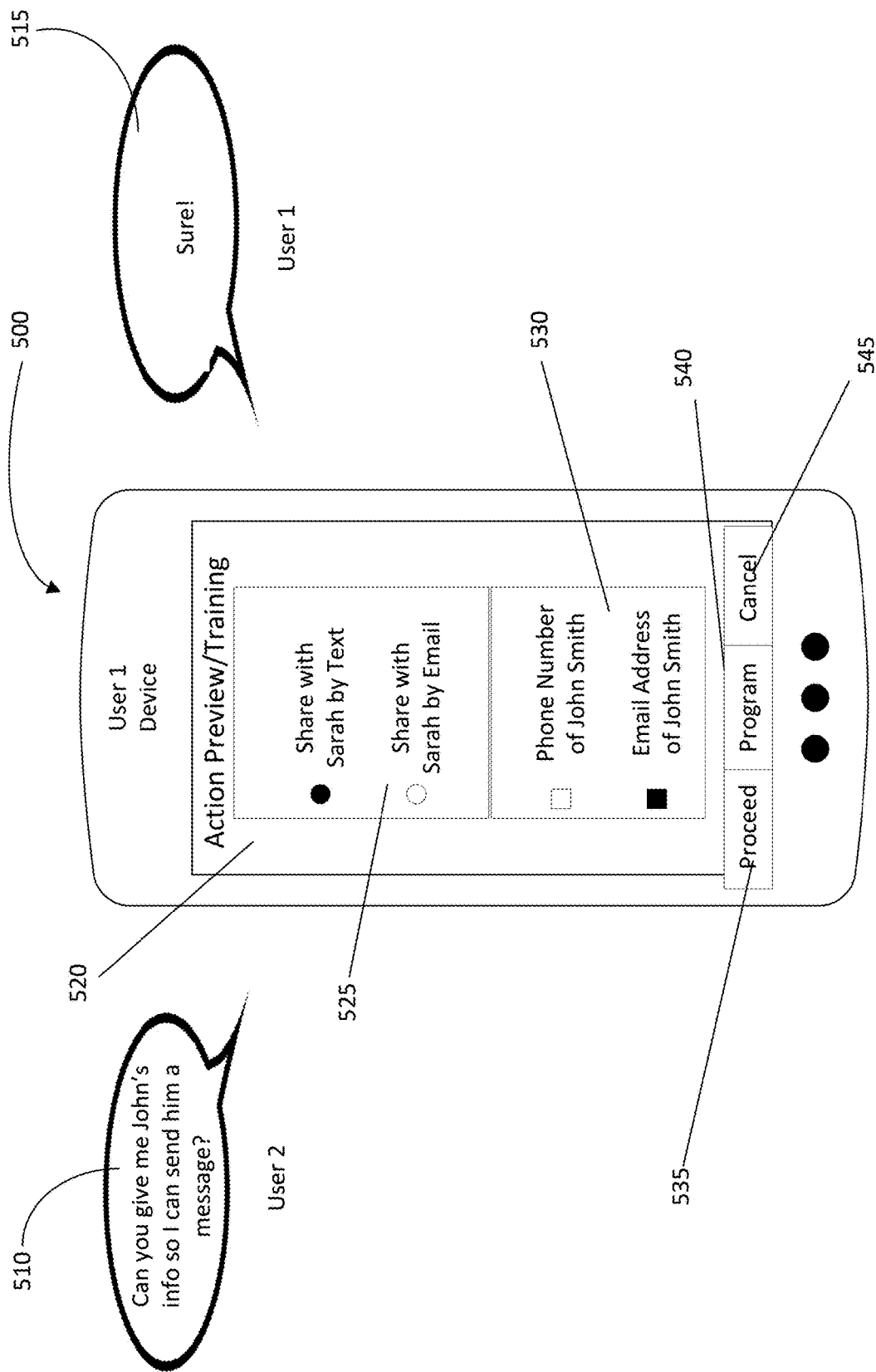
FIG. 1 depicts an illustrative user interface for previewing and programming command execution associated with a content request identified from a processed and analyzed voice communication, in accordance with some embodiments of the disclosure.

In some embodiments, prior to transmission or sharing of content, a preview interface may be presented on the voice communication device associated with affirming the request and/or associated with sharing the requested content. FIG. 1 depicts an illustrative user interface for previewing and programming command execution associated with a content request identified from a processed and analyzed voice communication, in accordance with some embodiments of the disclosure. A user device 500 is configured and programmed to provide a user interface for a user to preview, modify, or cancel actions and/or content identified by an automated action processing system such as described herein. A preview display 520 provides a selectable list 525 of one or more actions and a list 530 of one or more content items as identified by the system and based upon a processed voice communication. Pursuant to some embodiments as described herein, a captured voice request 510 is analyzed and identified as coming from a User 2 who voices a request for message contact information about a particular person while a subsequent contemporaneous recorded affirmation 525 is analyzed and identified as being received from a User 1 affirming the request by User 2. The list 525 of actions identified by the system includes options for sharing content by text message or by email communication as an example. In some embodiments, a default option is automatically selected such as based upon a prior configuration of the User 1 device. In some embodiments, the default selections are learned from prior user selections of similar voice communications/utterances monitored by the system. Similarly, list 530 includes options for the type of content to be shared in connection with the actions identified in list 525.

Display 520 is configured to accept input at 535 from a user to proceed with performing the actions and content selected from lists 520 and 525. A cancellation option may also be selected at 545 that will cancel the automated action/request from proceeding. In some embodiments, a further programming option may be selected at 540 that will present an interface for selecting other actions and/or content based upon the monitored voice communication. In some embodiments, the actions and/or content selected by a user may be monitored by the system to reprogram/reconfigure the system to identify particular actions and types of content in relation to future similar voice communications monitored by the system.

Figure 2:
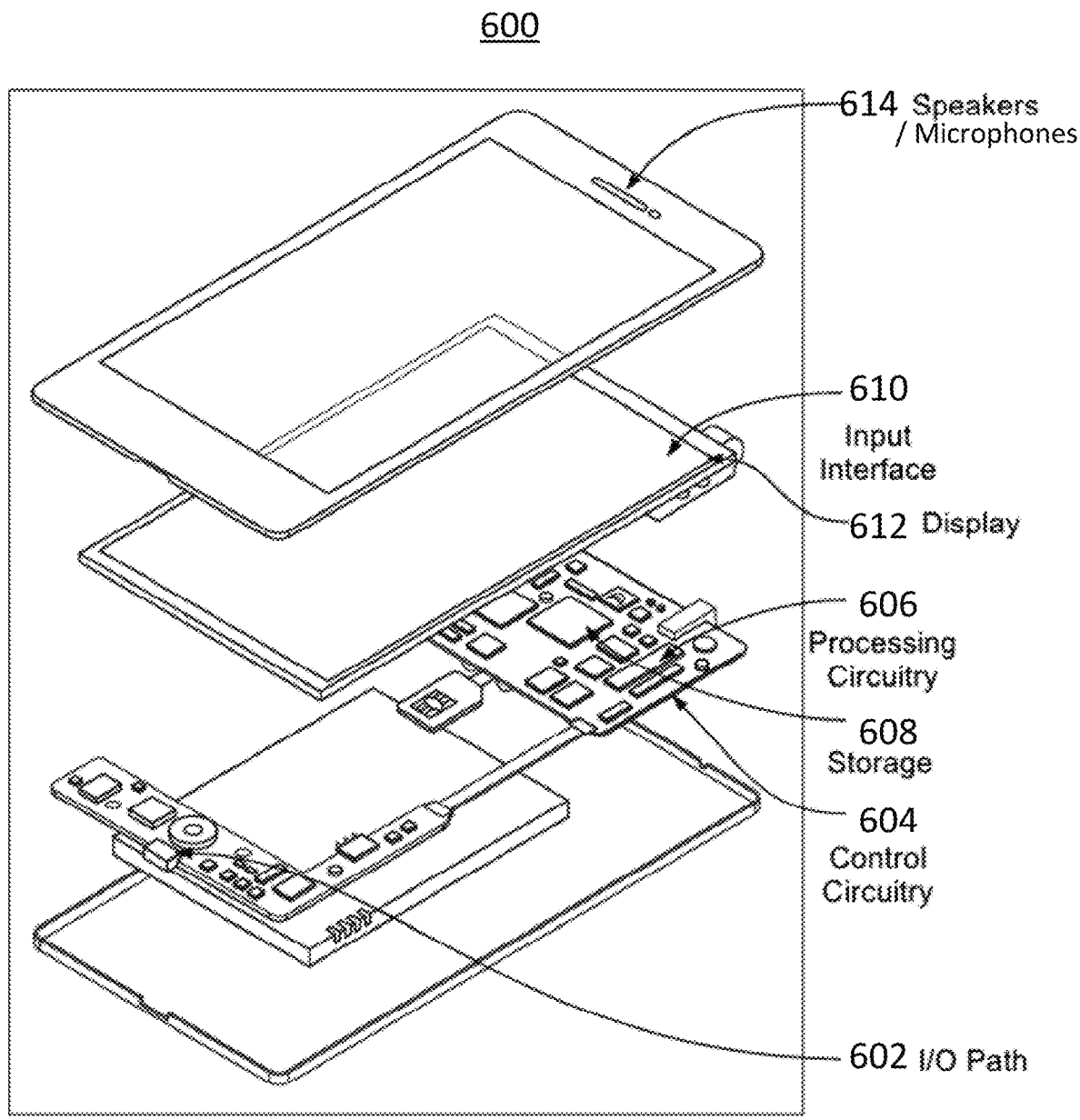
FIG. 2 is a diagram of an illustrative communication device in accordance with some embodiments of the disclosure.
Figure 3:
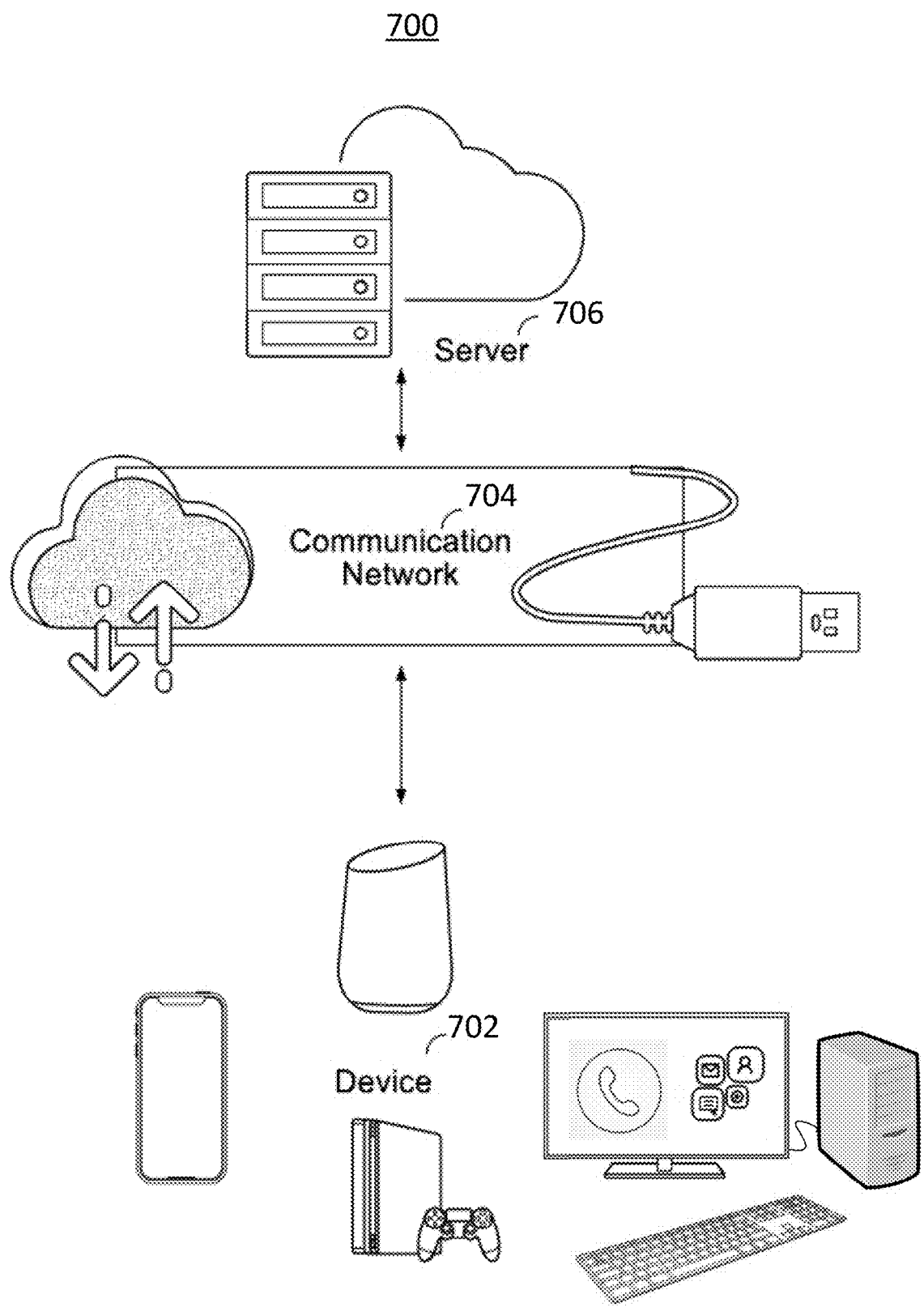
FIG. 3 shows a block diagram of a computer device processing environment, in accordance with some embodiments of the disclosure.

FIG. 2 shows a generalized embodiment of illustrative communication device 600. As referred to herein, the phrase "communication device" should be understood to mean any device that can process voice communications. FIG. 3 shows a block diagram of a computer device processing environment, in accordance with some embodiments of the disclosure. As depicted in FIG. 2, communication device 600 is a smartphone. However, communication device 600 is not limited to smartphones and may be any computing device with components for performing voice communications electronically. For example, communication device 600 of FIG. 2 can be implemented in system 700 of FIG. 3 as communication device 702 (e.g., a smartphone, a robot, a smart television, a smart speaker, a computer, or any combination thereof).

Communication device 600 may communicate a voice conversation via input/output (hereinafter I/O) path 602. I/O path 602 may provide received data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communication paths (described below). I/O functions may be provided by one or more of these communication paths, but are shown as a single path in FIG. 2B to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for processing voice communications stored in memory (i.e., storage 608).

A system for voice processing, analysis, and correlated command identification and execution (e.g., the systems described in reference to FIGS. 1, 4, 5, and 8) may be a stand-alone application implemented on a media device and/or a server. The system may be implemented as software or a set of executable instructions. The instructions for performing any of the embodiments discussed herein of voice communication processing may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 2 the instructions may be stored in storage 608, and executed by control circuitry 604 of a media device 600.

In some embodiments, a system for voice monitoring and correlated command identification and execution may be a client-server application where only the client application resides on a communication device 600 (e.g., media device 702), and a server application resides on an external server (e.g., server 706). For example, the system may be implemented partially as a client application on control circuitry 604 of media device 600 and partially on server 706 as a server application running on control circuitry. Server 706 may be a part of a local area network with media device 702, or may be part of a cloud computing environment accessed via the Internet. In a cloud computing environment, various types of computing services for performing searches on the Internet or informational databases, providing storage (e.g., for the vocabulary database) or parsing data are provided by a collection of network-accessible computing and storage resources (e.g., server 706), referred to as "the cloud." Media device 600 may be a cloud client that relies on the cloud computing capabilities from server 706 to generate the personalized actions in response to requests (the request identified in the voice communication 160 of FIG. 1). When executed by control circuitry of server 706, the system may instruct the control circuitry to process a voice conversation request and corresponding action and cause the transmission of associated content to media device 702. The client application may instruct control circuitry of the receiving media device 702 to generate content output. Alternatively, media device 702 may perform all computations locally via control circuitry 604 without relying on server 706.

Control circuitry 604 may include communications circuitry suitable for communicating with an automated action/NLP server, content server, content sharing platform server (e.g., servers 275, 280, and 290 respectively) or other networks or servers. The instructions for carrying out the above-mentioned functionality may be stored and executed on server 706. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communication network or paths. In addition, communications circuitry may include circuitry that enables peer-to-peer communication of media devices, or communication of media devices in locations remote from each other.

Memory may be an electronic storage device provided as storage 608 that is part of control circuitry 604. As referred to herein, the phrase "electronic storage device" or "storage device" should be understood to mean any device for storing data, computer software, or firmware, such as random-access memory, read-only memory, hard drives, optical drives, solid state devices, quantum storage devices, gaming consoles, or any other suitable fixed or removable storage devices, and/or any combination of the same. Nonvolatile memory may also be used (e.g., to launch a boot-up routine and other instructions). Cloud-based storage (e.g., on server 706) may be used to supplement storage 608 or instead of storage 608.

A user may send instructions to control circuitry 604 using user input interface 610 of media device 600. User input interface 610 may be any suitable user interface touch-screen, touchpad, stylus and may be responsive to external device add-ons such as a remote control, mouse, trackball, keypad, keyboard, joystick, voice recognition interface, or other user input interfaces. Display 612 (also referred to as display circuitry) may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Speakers/microphones 614 may be provided as integrated with other elements of user equipment device 600 or may be stand-alone units. An audio component of the monitored voice communications and other content displayed on display 612 may be played through speakers 614. In some embodiments, the audio may be received/distributed to/from a receiver (not shown), which processes and inputs/outputs the audio via speakers/microphones 614.

Control circuitry 604 may allow a user to provide user profile information or may automatically compile user profile information. For example, control circuitry 604 may monitor the words the user inputs in his/her queries. In some embodiments, control circuitry 604 monitors user inputs that are not queries, such as texts, calls, conversation audio, social media posts, etc., to detect input terms that share definitions with template terms. Control circuitry 604 may store the detected input terms in a vocabulary database linked to the user profile. Additionally, control circuitry 604 may obtain all or part of other user profiles that are related to a particular user (e.g., via social media networks), and/or obtain information about the user from other sources that control circuitry 604 may access. As a result, a user can be provided with a unified experience across the user's different media devices.

As depicted in FIG. 3, communication device 702 may be coupled to communication network 704. Communication network 704 may be one or more networks including the Internet, a mobile phone network, mobile voice or data network (e.g., a 4G or LTE network), cable network, public switched telephone network, Bluetooth, or other types of communications network or combinations of communication network. Thus, communication device 702 may communicate with server 706 over communication network 704 via communications circuitry described above. In should be noted that there may be more than one server 706 (e.g., automated action server 275, content server 280, and content sharing server 290 of FIG. 5 further described below), but only one is shown in FIG. 3 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths.

Figure 4:
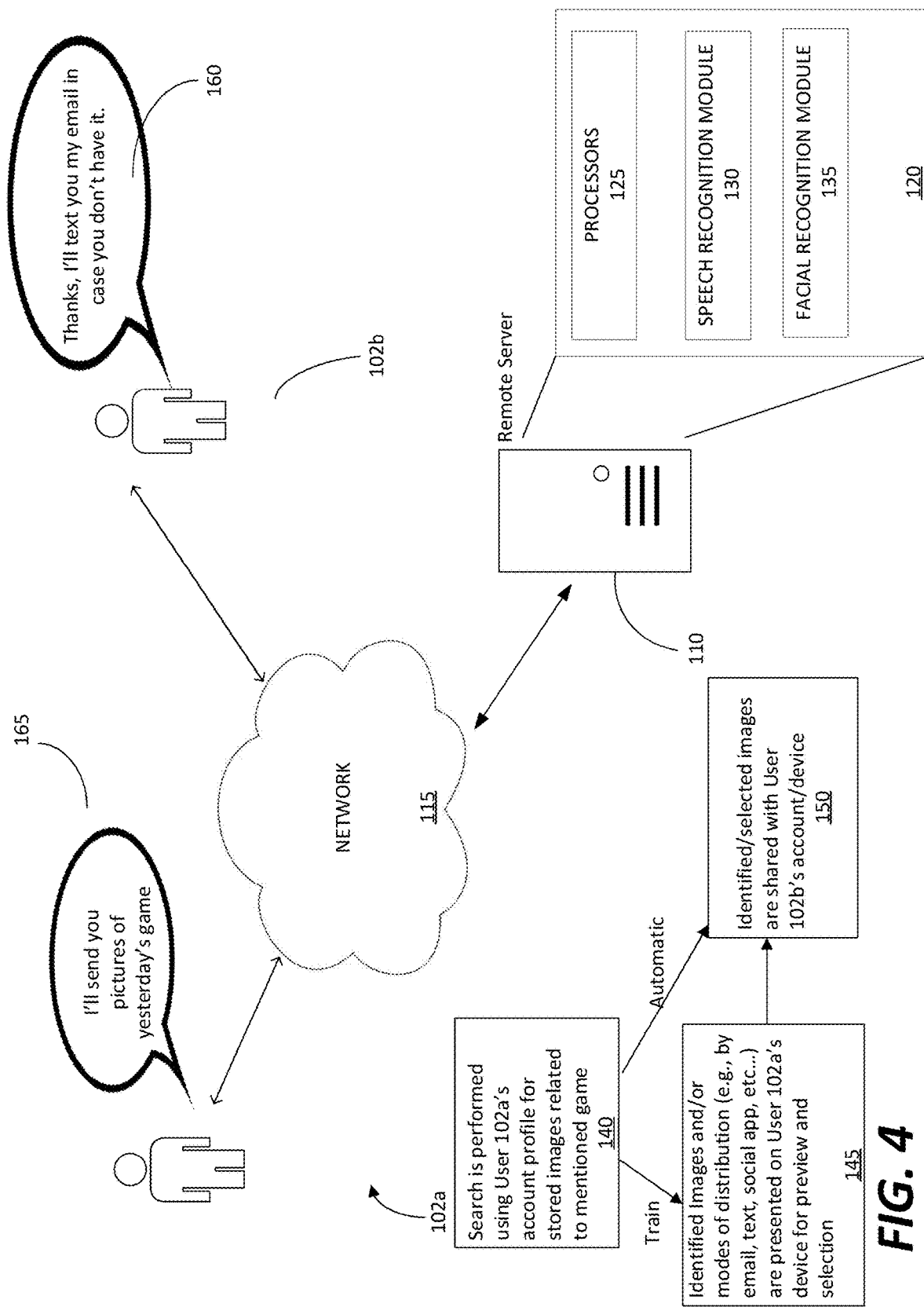
FIG. 4 depicts an illustrative scenario, process, and system for electronically processing voice communications and automating command identification and execution based upon the communications, in accordance with some embodiments of the disclosure.

FIG. 4 depicts an illustrative scenario, method, and system for processing and analyzing a voice conversation and automating command identification and execution based upon the conversation, in accordance with some embodiments of the disclosure. A user 102a and a user 102b communicate by voice with each other utilizing respective devices across a network 115. In some embodiments, the devices may include cellular phones, tablets, laptops, desktops, and others enabling voice communication.

While user 102a and 102b are speaking through their respective devices, their voice communications are processed by either of the respective devices and/or a remote server 110 which receives the voice communications carried on network 115. In an embodiment, server 110 may include a voice command processing system 120 that includes one or more processors 125, a speech recognition module 130, and a facial recognition module 135. Processors 125 are programmed and configured to execute computer-readable instructions from the speech recognition module 130 and the facial recognition module 135. The speech recognition module 130 is programed with instructions to process the voice communications between user 102a and 102b and convert them into electronic text format. although conversion to other formats for analysis are equally usable. In some embodiments, the speech recognition module 130 may further distinguish and characterize the communications between user 102a and 102b utilizing, for example, a voice recognition process that is configured to identify different voice patterns among users and associated user accounts (e.g., those associated with users 102a and 102b).

In some embodiments, the facial recognition module 135 is programmed to correlate different voice patterns identified by speech recognition module 130 with unique facial features of different users (e.g., user 102a and 102b) captured utilizing cameras connected with respective voice communication devices. Facial recognition can be further utilized to associate voices captured by communication devices with particular user accounts.

As voice communications are processed into text and distinguished between different users, the voice communications are processed, such as by voice command processing system 120, to identify particular commands for automated processing. In some embodiments, identification of a particular command may include identifying a particular utterance by a user that the system correlates with the particular command.

For example, voice command processing system 120 may be configured to identify the utterance of "send" within voice communications and programmed to further analyze the context of communications between user accounts or devices within which the "send" utterance is identified. When user 102b speaks to user 102a, for example, and requests data from user 102a at 160 by, for example, saying "send me the pictures from the game yesterday", voice command processing system 120 further analyzes the communications to identify what user 102b or user account may be requesting that user 102a send. Voice processing system may also identify an affirmative response following the request at 165 ("will do") from user 102a agreeing to perform the request (using user 102a's user account). A similar analysis can be performed on detection of an offer to send specific data as, for example, "I can send you the pictures from the game yesterday" and the affirmative "yes please".

A natural language processor ("NLP") and/or artificial intelligence, which may be integrated with or separate from voice command processing system 120, identifies the request/command to be performed along with identifying any parameters pertaining to the request. For example, the NLP may translate the request from user 102b to send "pictures from the game yesterday" as a request to send images catalogued by user 102a from a "game" event that occurred the day before ("yesterday"). The above and below discussions of utilizing NLPs to determine and distinguish semantic meanings of requests/actions and their context relates to a science called Natural Language Processing. Natural Language Processing is discussed at length in U.S. Pat. No. 8,954,318, filed Nov. 4, 2013, and granted on Feb. 10, 2015, as well as on the website of The Stanford Natural Language Processing Group (http://nlp.stanford.edu) (accessed on Jul. 17, 2019) and on Wikipedia's article entitled "Outline of natural language processing" (http://en.wikipedia.org/wiki/Outline_of_natural_language_processing) (accessed on Jul. 19, 2019), each of which are hereby incorporated by reference herein in their entireties System 120 is programmed and configured to perform a search at processing block 140 for stored images associated with 102a's user account related to a "game" event that occurred the day before. System 120 may be programmed, for example, with artificial intelligence code to analyze data (e.g., GPS data, social media location "check-ins") associated with user 102a's account and user 102b's account and/or their respective devices to determine whether either of the user(s) devices were located at a geographic location the day before that are associated with any "games" (e.g., a stadium) and further identify any images that were captured and/or user 102a's account is associated with (e.g., "tagged" with social media) during the time user 102a's device was present at the geographic location(s). Once such images are identified, the images may be either automatically shared with user 102b using user 102b's user account (e.g., by email, text, social media) at block 150 or user 102a's device may present an interface at block 150 for user 102a to preview the action(s) and identified image(s) that processing system 120 has selected for transmitting/sharing automatically.

In some embodiments, all or part of the described processing may be performed directly by either or both of the user devices themselves.

Figure 5:
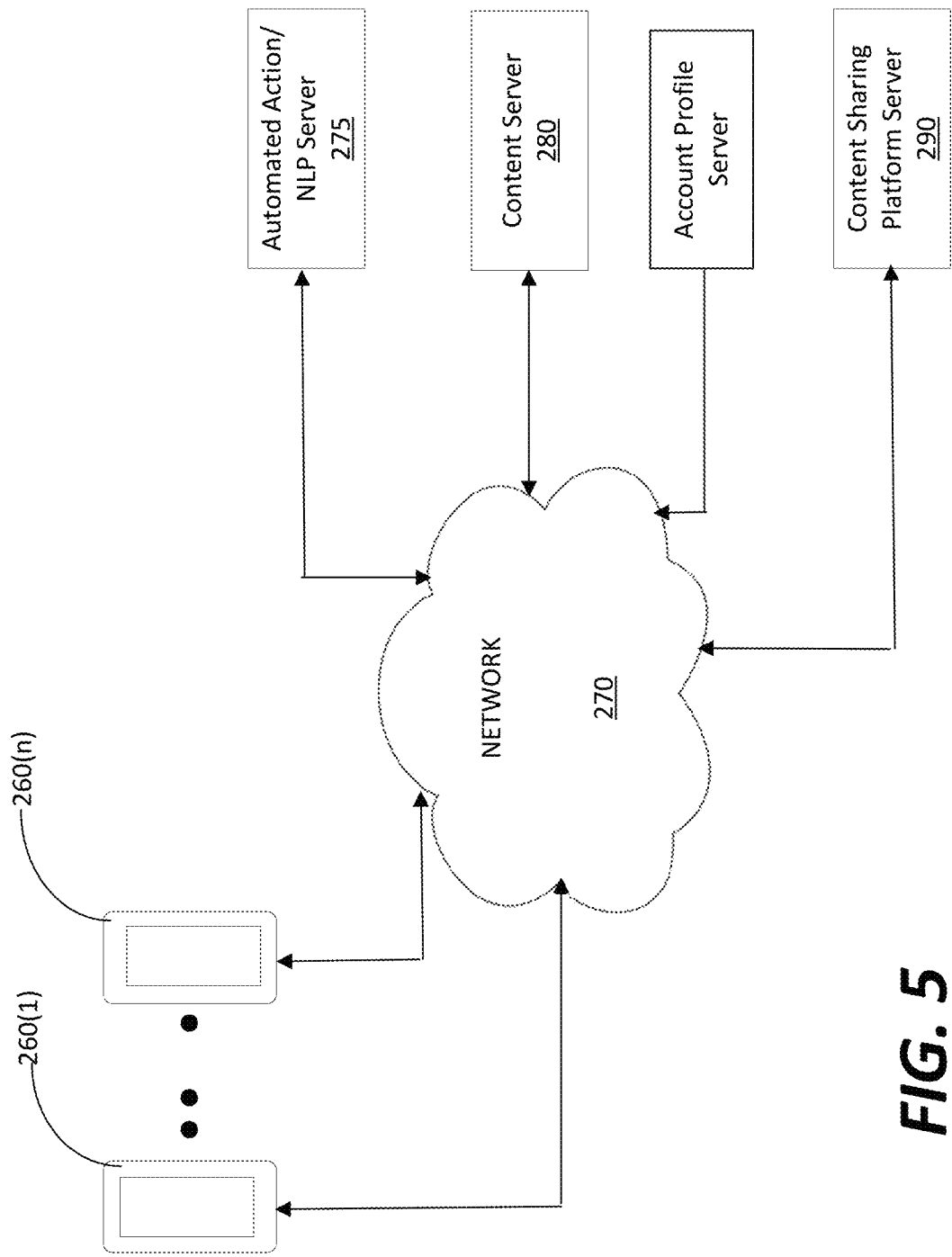
FIG. 5 is a diagram of components of an illustrative voice communication processing system in accordance with some embodiments of the disclosure.

FIG. 5 shows a block diagram of a system for voice capture and processing and correlated command identification and execution, in accordance with some embodiments of the disclosure. Two or more devices 260(1), . . . , 260(n)

are connected by a communication network 270 in which they are configured for capturing and processing voice communications of respective users of the devices. An automated action and NLP server 275 is also connected with devices 260(1), . . . , 260(n) and is configured to process voice communications transmitted between the connected devices. In some embodiments, server 275 either receives or is configured to convert the voice communications into text format. Server 275 is further configured to identify actions within the voice communications that may be processed as particular computer-executable actions. Identifying the actions may include analyzing the communications for particular utterances or phrases representative of a request to perform an action such as, for example, "send," "please share," "email me," "text," etc.

If a particular action-triggering utterance occurs, server 275 further processes the communications surrounding the utterance to determine if a particular action is actually being requested, any parameters (e.g., content) associated with the request/action, and whether an affirmation is given in response to the request. In some embodiments, the NLP performs the further processing to determine the action, any parameter(s)/attachments, and/or affirmation associated with the request/action. For example, as described above with respect to FIG. 1, a request/action by a user may include a request to share particular content (e.g., images, contact information, etc.). In some embodiments, server 275 distinguishes between voices of different users by analyzing voice characteristics such as for distinguishing between a request from one user and an affirmation of the request by another user. The user affirming the request and his/her associated user account(s) are then identified as the source from which content is shared. The NLP may process and may be enabled to learn how to process the communications and various particular scenarios such as based upon user feedback and machine learning as further described herein.

A content server 280 may be accessed from server 275 and devices 260(1), . . . , 260(n) to identify and share content such as with users of the devices. In some embodiments, content server 280 is utilized as a repository for content and/or for identifying/managing storage (e.g., a database server) and/or for distribution of the content. The content server 280 maintains parameters associated with content (e.g., times, places, names, users, etc.) that may be used to search for the particular content connected with the requested action identified by action server 275 and an NLP. Based upon a search performed and/or requested by action server 275, the content server 280 may identify requested content and/or its location.

In some embodiments, a content sharing platform server (e.g., for Facebook, Instagram, a cloud/file sharing service, etc.) is accessed by action server 275 or by one or more of devices 260(1), . . . , 260(n) to perform the requested action such as sharing an image, posting a message with contact information, making a "friend request," etc.

Figure 6:
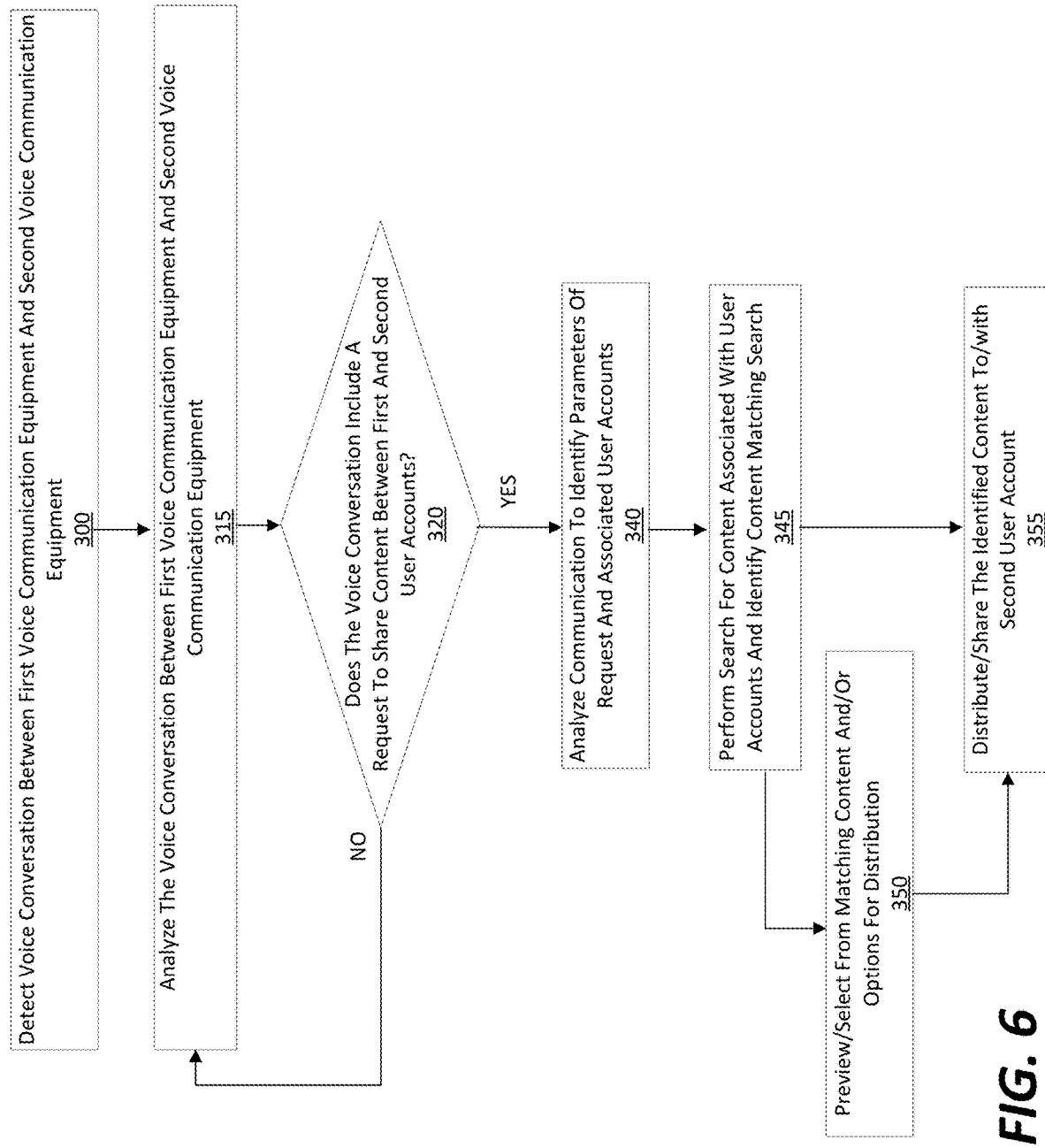
FIG. 6 shows an illustrative flowchart of voice communication processing and automated command identification and execution, in accordance with some embodiments of the disclosure.

FIG. 6 shows an illustrative flowchart of voice communication processing and correlated command identification and execution, in accordance with some embodiments of the disclosure. At block 300, a voice communication between multiple users across respective devices is detected. The detection may be performed by one or more of the devices and/or by an external server through which voice communications between devices are processed. At block 315, the processed voice communications are monitored and analyzed for particular communications representative of a voice command (or request). As further described herein, such communications may include particular utterances of certain words or phrases. At block 320, if the analyzing determines that the communication represents a request/command (e.g., an actionable request for content) from a voice communication device, the voice communications are further processed at block 340 to further analyze the request. Otherwise, if no request/command is identified, voice communications continue to be processed at block 315.

At block 340, the voice communication is further analyzed to identify parameters of the request including a determination of the action/command and the specific content being requested. The requested command is also correlated with particular user account(s) through which and to which the requested content is being transmitted/shared (e.g., source and destination email/social media user accounts). As further described herein, this may be done by correlating voice characteristics, facial characteristics, and/or voice communication devices corresponding to the voice communications.

Parameters relating to requested content extracted from voice communications can include the type of content (e.g., images, files, contact information, etc.) and computer-executable mode of transmission/sharing (e.g., email, text, instant messenger, etc.). Additional parameters can include specific parameters pertaining to the requested content. These parameters can be extracted from the communications such as through the use of a NLP. For example, an NLP may be configured to determine that requested content is associated with particular parameters such as a particular time, event, geographic location, and/or person. A content server (e.g., content server 280 of FIG. 5) and/or a user device associated with the user account transmitting/sharing the content may be directed to perform the search and identify requested content.

After the requested action(s) and associated content has been identified, the actions are performed at block 355. In some embodiments, the requested actions and identified content is first presented for preview/approval at block 350 through the affirming user's device such as through a user interface (e.g., as further described in connection with FIG. 1) before the actions are performed.

Figure 7:
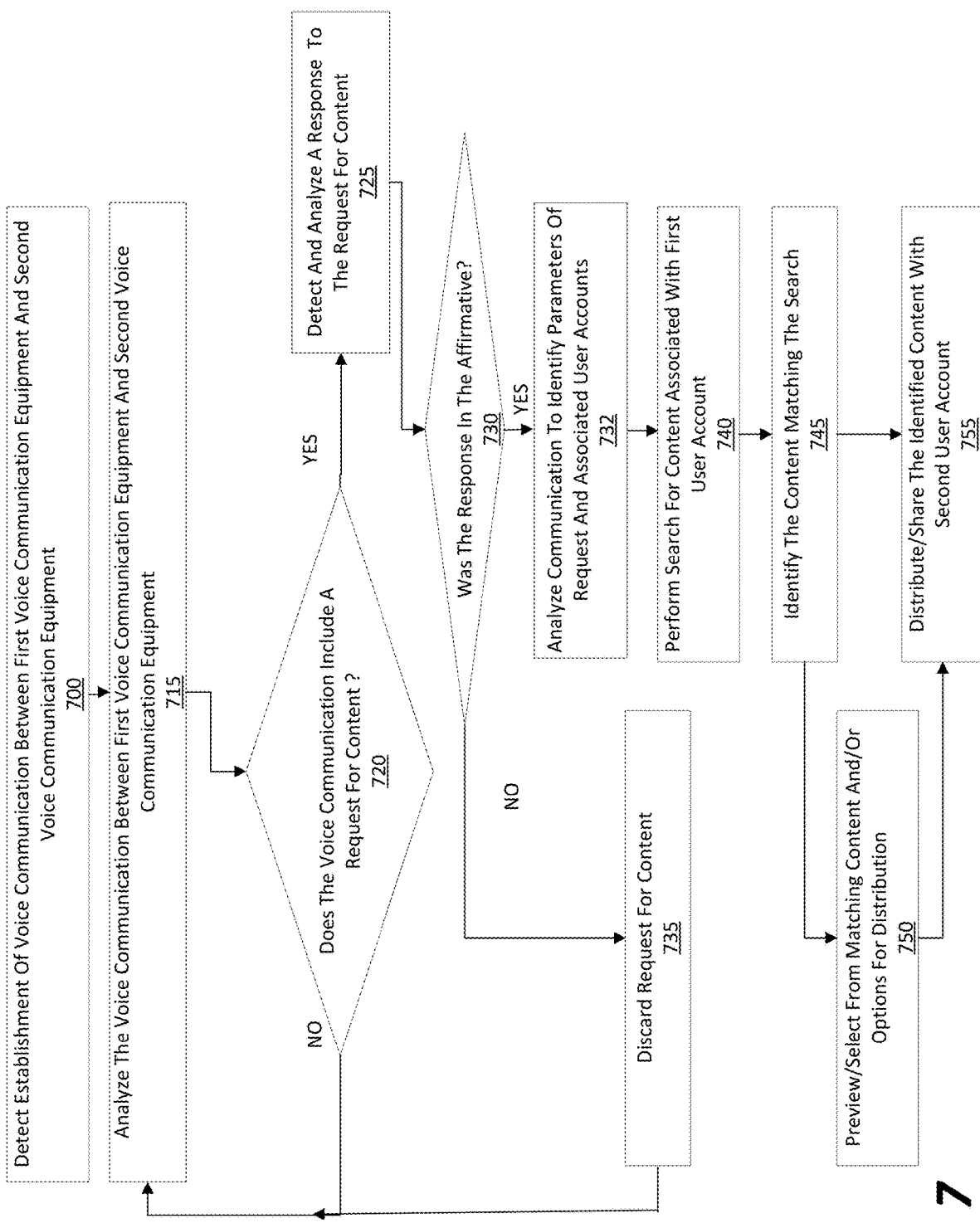
FIG. 7 shows an illustrative flowchart of voice communication processing and automated command identification and execution, in accordance with some embodiments of the disclosure.

FIG. 7 shows an illustrative flowchart of voice communication processing and correlated command identification and execution, in accordance with some embodiments of the disclosure. At block 700, a voice communication between multiple users across respective devices is detected. The detection may be performed by one or more of the devices and/or by an external server through which voice communications between devices are processed. At block 715, the processed voice communications are monitored and analyzed for particular communications representative of a voice command (or request). As further described herein, such communications may include particular utterances of certain words or phrases. At block 720, if the analyzing determines that the communication represents a request/command (e.g., an actionable request for content) by a user, the voice communications are further processed at block 725 to determine if a user affirms the request/command. Otherwise, if no request/command is identified, the request is discarded at block 735 and further voice communications continue to be processed at block 715.

At block 730, a determination is made (e.g., by an NLP) as to whether the voice communications include an affirmation by one of the users that the request/action should be performed. Such a determination may include affirmative responses/utterances/phrases such as "yes," "sure," "ok," "please do," and other traditional or custom-configured responses determined by the NLP as an affirmation of the request. In some embodiments, if no affirmation is identified, the request is discarded at block 735 and voice communications continue to be processed at block 715 without performing the identified request/action. If an affirmation is confirmed, the users or user accounts associated with making the request and affirming the request are identified (e.g., by voice recognition, face recognition, device microphone input) at block 732 and processing of the request continues at block 740. The voice communications are also further processed (such as with an NLP) to identify which computer-executable action(s) (e.g., email, text, etc.) are to be automatically performed in connection with the request.

At block 740, the voice communications are further analyzed to identify any content (e.g., images, contact information, etc.) to be processed (e.g., attached, linked) in connection with the requested action. In some embodiments, the content is identified through a search process based upon the processed voice communications (e.g., with an NLP). For example, an NLP may be configured to determine that requested content is associated with particular parameters such as a particular time, event, geographic location, and/or person. A content server (e.g., content server 280 of FIG. 5) and/or a user device associated with the affirming user may be directed to perform the search and identify requested content.

After the requested action(s) and associated content has been identified, the actions are performed at block 755. In some embodiments, the requested actions and identified content is first presented for preview/approval at block 750 on the affirming user's device such as through a user interface (e.g., as further described in connection with FIG. 1) before the actions are performed.

Figure 8:
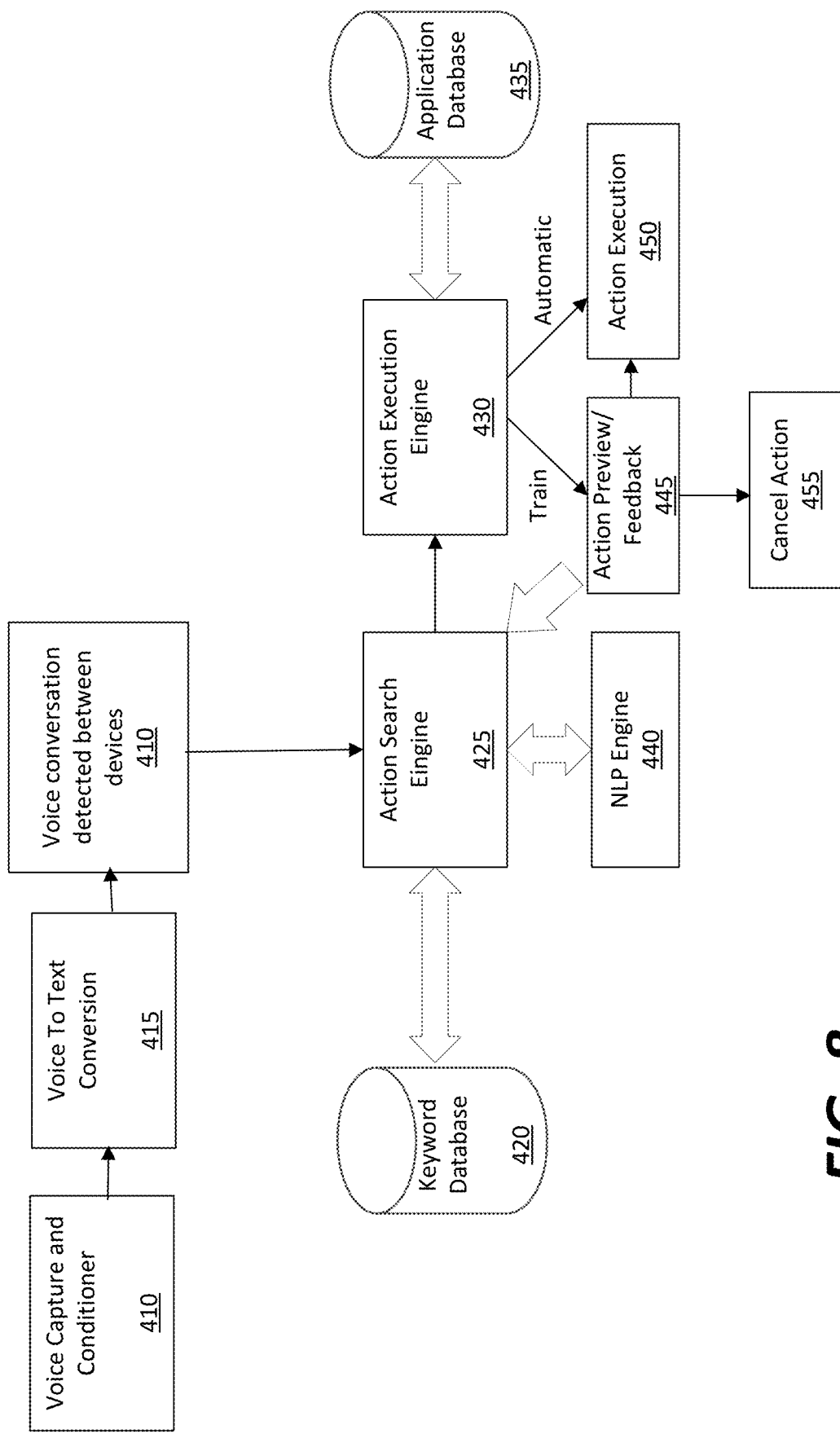
FIG. 8 shows an illustrative flowchart of voice communication processing and automated command identification and execution, in accordance with some embodiments of the disclosure.

FIG. 8 shows an illustrative flowchart of voice communication processing and automated command identification and execution, in accordance with some embodiments of the disclosure. Voice communications between user devices such as described herein (e.g., devices 260(1), . . . , 260(n) of FIG. 5 as represented by device 600 of FIG. 2) are captured and conditioned at block 410. Voice capture may be performed by the user device's microphones/electronic recording components that are connected or integrated with the devices. Conditioning may include removal of noise, the amplification of human voices, and/or other known recorded voice conditioning techniques. Captured voice communications are then converted to text at block 415 such as through the use of voice recognition software known to those of ordinary skill in the art. The devices and/or an external server (e.g., remote server 110 of FIG. 4, automated action/NLP server 275 of FIG. 5) may perform part or all of the conditioning and conversion to text. In some embodiments, the converted text is characterized according to particular users/devices from which the corresponding voice communications were captured.

The capturing of voice communications according to FIG. 4, for example, may be implemented with respect to the steps of detecting voice communications between users as described in steps 300 and 315 of FIG. 6.

The converted text is processed by an action search engine 425 to identify requested actions (e.g., sharing of content) and affirmation of the requests. Identification of requests may be performed such as by identifying particular words or utterances within the converted text as further described herein. Such words or utterances and corresponding actions may be managed within a keyword computer database 420. The action search engine 425 is utilized to further correlate the requests with specific computer-executable actions, particular users, and any content to be processed by way of the actions (e.g., emailing/texting an image of certain people, places, and/or events). In some embodiments, an NLP engine 440, a content server (e.g., content server 280 as shown and described in connection with FIG. 5), and/or user devices may be utilized to process and identify the requests and to which users/devices the requests are made to. For example, a request for an image from a particular user who participated in an event at a particular time will cause the action search engine 425 to search for images associated with that user, place, and time such as by utilizing the user's device and/or a content server as further described herein.

The conversion and analysis of voice communications and subsequent search for content according to FIG. 4, for example, may be implemented with respect to the steps of determining whether voice communications between users include a request for content, an affirmation of the request, and search for content as described in steps 320, 325, 330, 340, and 345 of FIG. 3.

In some embodiments, an application database 435 is accessed to determine which computer-executable applications are to be used for processing particular types of requests. For example, certain utterances or keywords (e.g., "friend me", "text me your address") identified from the voice communications may be associated in the database 435 with particular user applications (e.g., Facebook, Messenger).

Once the action and associated content have been identified, the action is performed at block 450 or presented for review, confirmation, and/or revision through a user's device at block 445. At block 445, a device is programmed to receive input from a user to affirm or modify the action and/or associated content before action execution (e.g., as described further in reference to FIG. 5), or cancel the action at block 455. In some embodiments, the input received from the user at block 445 is stored and utilized with the respectively monitored voice communications to dynamically guide/reprogram the action search engine 425, keyword database 420, and/or action execution engine 430 to correlate particular voice communications with particular actions and/or content (e.g., through machine learning).

We claim:

1. A computer-implemented method for sharing content, the method comprising:
   detecting establishment of a voice communication between a first device and a second device;
   analyzing the voice communication to identify a request for or offer of content from the first device;
   identifying the request for content or offer as a request to share content between a first user account and a second user account;
   identifying from a data storage, the requested or offered content; and
   causing the sharing of the requested or offered content with the second user account.

2. The method of claim 1, wherein the requested or offered content comprises one or more data files, and wherein identifying the requested or offered content from the data storage comprises:
   analyzing the voice communication to identify at least one of a subject, geographic location, or a time period associated with the requested or offered data files and the first user account; and
   searching data storage associated with the first user account to identify a set of data files associated with the identified at least one of a subject, geographic location, or time period.

3. The method of claim 1, wherein identifying the request for or offer of content comprises:
performing speech recognition on the audio signal representing the voice communication to identify a pre-defined utterance;
wherein identifying the request for or offer of content is based upon identifying the pre-defined utterance on the audio signal.

4. The method of claim 3, wherein the pre-defined utterance is identified with a request for or offer of at least one of contact information, a geographic location, an invitation, an internet link, or an electronic file.

5. The method of claim 1, wherein the first user account is identified by association with the first device and the second user account is identified by association with the second voice device.

6. The method of claim 1, wherein the at least one of the first user account or second user account is identified by processing voice characteristics of the voice communication and correlating the voice characteristics with a corresponding user account.

7. The method of claim 1, wherein causing transmission of the requested or offered content comprises selecting and causing execution of one or more computer executable commands for transmitting the requested content.

8. The method of claim 7, wherein the one or more computer executable commands comprise at least one of electronically sharing contact information, electronically sharing the location of the first or second device, sending an electronic instant message, or sending an electronic invitation.

9. The method of claim 1, wherein identifying the request for or offer of content comprises analyzing the voice communication in an action search engine programmed to identify actionable portions of the voice communication using a keyword database, wherein identified actionable portions are further processed by a natural language processor (NLP) programmed and configured to learn, model, identify, and process requests or offers for transmitting content.

10. The method of claim 9 wherein at least one of the first device and a second device is programmed and configured to provide a graphical user interface for previewing one or more content transmission actions identified by the NLP, receiving user input selecting and affirming at least one of the previewed content transmission actions, and proceeding with causing the transmission of the requested or offered content based upon the user input selection, wherein the NLP is further configured to learn, model, identify, and process requests or offers based upon the previewing and selecting one or more content transmission actions.

11. A system for sharing content from a first user equipment, the system comprising one or more processors programmed with instructions to cause the one or more processors to perform:
detecting establishment of a voice communication between a first device and a second device;
analyzing the voice communication to identify a request for content;
identifying the request for content as a request to share content between a first user account and a second user account;
identifying from a data storage, the requested content; and
causing the sharing of the requested content with the second user account.

12. The system of claim 11, wherein the requested content comprises one or more images and wherein identifying the requested content from the data storage comprises:
analyzing the voice communication to identify at least one of a subject, geographic location, or a time period associated with the requested one or more images and the first user account; and
searching data storage associated with the first user account to identify a set of images associated with the identified at least one of a subject, geographic location, or time period.

13. The system of claim 12, wherein identifying the request for content comprises:
performing speech recognition on the audio signal representing the voice communication to identify a pre-defined utterance;
wherein identifying the request for content is based upon identifying the pre-defined utterance on the audio signal.

14. The system of claim 13, wherein the pre-defined utterance is identified with a request for at least one of contact information, a geographic location, an invitation, an internet link, or an electronic file.

15. The system of claim 11, wherein the first user account is identified by association with the first device and the second user account is identified by association with the second device.

16. The system of claim 11, wherein the at least one of the first user account or second user account is identified by processing voice characteristics of the voice communication and correlating the voice characteristics with a corresponding user account.

17. The system of claim 11 wherein causing transmission of the requested content comprises selecting and causing execution of one or more computer executable commands for transmitting the requested content.

18. The system of claim 17 wherein the one or more computer executable commands comprise at least one of electronically sharing contact information, electronically sharing the location of the first or second user equipment, sending an electronic instant message, or sending an electronic invitation.

19. The system of claim 11 wherein identifying the request for content comprises analyzing the voice communication in an action search engine programmed to identify actionable portions of the voice communication using a keyword database, wherein identified actionable portions are further processed by a natural language processor (NLP) programmed and configured to learn, model, identify, and process requests for transmitting content.

20. The system of claim 19 wherein at least one of the first voice communication equipment and a second voice communication equipment is programmed and configured to provide a graphical user interface previewing one or more content transmission actions identified by the NLP, receiving user input selecting and affirming at least one of the previewed content transmission actions, and proceeding with causing the transmission of the requested content based upon the user input selection, wherein the NLP is further configured to learn, model, identify, and process requests based upon the previewing and selecting one or more content transmission actions.

* * * * *